United States Patent
Goggin et al.

(10) Patent No.: US 8,489,699 B2
(45) Date of Patent: Jul. 16, 2013

(54) LIVE MIGRATION OF VIRTUAL MACHINE DURING DIRECT ACCESS TO STORAGE OVER SR IOV ADAPTER

(75) Inventors: Edward Joseph Goggin, Cambridge, MA (US); Hariharan Subramanian, Wakefield, MA (US); Sanjana Aswani, Boston, MA (US); Adam M. Belay, Cambridge, MA (US); Anurekh Saxena, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 517 days.

(21) Appl. No.: 12/856,399

(22) Filed: Aug. 13, 2010

(65) Prior Publication Data
US 2012/0042034 A1 Feb. 16, 2012

(51) Int. Cl.
*G06F 15/167* (2006.01)
*G06F 21/00* (2006.01)
*G06F 9/455* (2006.01)

(52) U.S. Cl.
USPC ............. 709/213; 709/216; 711/6; 718/1

(58) Field of Classification Search
USPC ............ 709/212–213, 216–219; 711/6; 718/1
See application file for complete search history.

(56) References Cited

U.S. PATENT DOCUMENTS

| 7,904,692 | B2* | 3/2011 | Mukherjee et al. | 711/203 |
| 8,086,821 | B2* | 12/2011 | Mukherjee et al. | 711/203 |
| 2008/0222633 | A1* | 9/2008 | Kami | 718/1 |
| 2011/0197039 | A1* | 8/2011 | Green et al. | 711/162 |
| 2011/0208908 | A1* | 8/2011 | Chou et al. | 711/112 |

* cited by examiner

*Primary Examiner* — Yasin Barqadle (57) ABSTRACT

A method is provided to migrate a virtual machine from a source computing machine to a destination computing machine comprising: suspending transmission of requests from a request queue disposed in source computing machine memory associated with the VM from the request queue to a VF; while suspending the transmission of requests, determining when no more outstanding responses to prior requests remain to be received; in response to a determination that no more outstanding responses to prior requests remain to be received, transferring state information that is indicative of locations of requests inserted to the request queue from the VF to a PF and from the PF to a memory region associated with a virtualization intermediary of the source computing machine. After transferring the state information to source computing machine memory associated with a virtualization intermediary, resuming transmission of requests from locations of the request queue indicated by the state information to the PF; and transmitting the requests from the PF to the physical storage.

15 Claims, 6 Drawing Sheets

LIVE MIGRATION OF VIRTUAL MACHINE DURING DIRECT ACCESS TO STORAGE OVER SR IOV ADAPTER

BACKGROUND OF THE INVENTION

A host computer system may run multiple virtual machines (VMs) that share common resources, such as physical storage. Physical storage used by the VMs typically is emulated so as to present virtual storage resources to the VMs. A virtualization intermediary manages interaction between VMs and physical storage. Some prior virtualization intermediaries "trap" (intercept) virtual storage requests issued by individual VMs and to thereby intervene in the storage access requests so as to redirect the requests from virtual targets to physical targets. Such earlier virtualization intermediary uses trap handlers during emulation to redirect IO commands to prevent storage access violations. However, this emulation can be expensive in terms of instructions processed. Overall performance may decline when many VMs seek to access physical storage at the same time. The many storage requests can result in data access delays due to the compute cycles required by the virtualization intermediary to trap and translate simultaneous data requests from many VMs.

One solution to this problem has been proposed in the Single Root Virtualization I/O and Sharing Specification, Revision 1.0, Sep. 11, 2007 (PCI-SIG SR-IOV) specification. The PCI-SIG SR-IOV specification proposes providing each of one or more VMs with direct access to physical storage through its own storage adapter instance as a designated virtual function (VF) running on a physical storage adapter. This avoids the need for heavy intervention by the virtualization intermediary to gain access to physical storage.

Live migration typically involves the ability to move a VM from a source physical machine to a destination physical machine, possibly one with different IO adapter hardware, at almost any point in a VM's work flow without affecting correctness of processing by the VM and without significantly affecting the availability of the VM. In general, migration involves a virtualization intermediary intervening to suspend a VM's execution at any instruction boundary and to control the flow of the VM's IO during the migration process. The virtualization intermediary also tracks and quiesces IO initiated by the VM on the source migration host and resumes the IO on the destination migration host. However, direct access by a VM to physical storage that bypasses intervention of the virtualization intermediary complicates live migration of a virtual machine across physical machines, since the virtualization intermediary does not intervene in VM IO operations.

SUMMARY OF THE INVENTION

In one aspect, a virtual machine (VM) migrates from a source computing machine to a destination computing machine. The source computing machine is configured to implement the VM and a virtualization intermediary. The source computing machine includes a physical storage adapter that is configured to implement a physical function (PF) and a virtual function (VF) to support IO operations between the VM and physical storage. The migration occurs while the VM runs an application that involves the VM inserting IO requests into an IO request queue associated with the VM and that involves the VF de-queuing the IO requests from the IO request queue and transmitting the IO requests to physical storage. The VM's running the application also involves the VF inserting one or more IO responses received from the physical storage to an IO response queue associated with the VM. State information that is indicative of the request queue and of the response queue is provided within a memory region of the VF. In the course of migration, de-queuing of requests from the request queue is suspended. While the de-queuing is suspended, state information is transferred from the VF memory region to a memory region associated with the virtualization intermediary within the source computing machine. Subsequently, the state information is transferred from the second memory region within the source computing machine to the destination machine.

In another aspect, prior to VM migration, during normal IO access involving direct access to storage, i.e. substantially without virtualization intermediary intervention, an IO request queue includes one or more requests produced by a guest operating system of the VM. State information that is indicative of one or more locations of requests within the request queue is transmitted from the VM to the VF. Requests are de-queued from the request queue to the VF from locations indicated by the first state information and are then transmitted from the VF to physical storage. The VF receives responses to the transmitted requests from physical storage. During VM migration, de-queuing of requests from the request queue to the VF is suspended. In response to a determination that no more outstanding responses to previous requests remain to be received, the first state information is transferred from the VF to the PF and from the PF to a memory region associated with the virtualization intermediary of the source computing machine. After the first state information has been transferred to the source computing machine memory, the VM resumes normal operation, but with virtualization intermediary intervention in IO access. One or more IO requests are de-queued from locations in the request queue indicated by the first state information to the PF. The requests then are transmitted from the PF to the physical storage.

Thus, in yet another aspect, prior to VM migration, during normal IO access involving direct access to storage, i.e. substantially without virtualization intermediary intervention, one or more requests are transmitted from a VF to a physical storage. The VF receives responses to the transmitted requests from physical storage. Second state information is provided within the VF that is indicative of one or more locations in a response queue disposed within source computing machine memory associated with the source VM. IO responses received by the VF are inserted to one or more locations in the response queue indicated by the second state information. During VM migration, the transmission of responses is suspended. In response to a determination that no more outstanding responses to previous requests remain to be received, the second state information is transferred from the VF to the PF and from the PF to a memory region of the source computing machine. After transferring the second state information to source computing machine memory, the VM resumes normal operation, but with virtualization intermediary intervention in IO access. Requests are transmitted from the PF to the physical storage. Responses are received by the PF from the physical storage. Responses received by the PF are inserted to one or more locations in the response queue indicated by the second state information.

These and other features and advantages will be apparent from the following description of embodiments in conjunction with the illustrative drawings.

DETAILED DESCRIPTION OF THE EMBODIMENTS

The following description is presented to enable a person skilled in the art to create and use a computer system configured for use with an SR-IOV adapter in which a virtual machine using a direct data path access to storage can migrate between different host machines. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

In this description, reference is sometimes made to a virtual machine, a hypervisor kernel, virtual machine monitors (VMMs), a virtualization intermediary or some other virtualized component taking some action. Persons skilled in the art will appreciate that a hypervisor kernel, VMMs and a virtualization intermediary comprise one or more software layers that run on a host system, which comprises hardware and software. In order to perform any given action, a virtual machine, virtualization intermediary or other virtualized component configures physical resources of the host machine to perform the given action. For example, a virtualization intermediary may configure one or more physical processors, according to machine readable program code stored in machine readable storage device.

Overview of Virtualization

Figure 1:
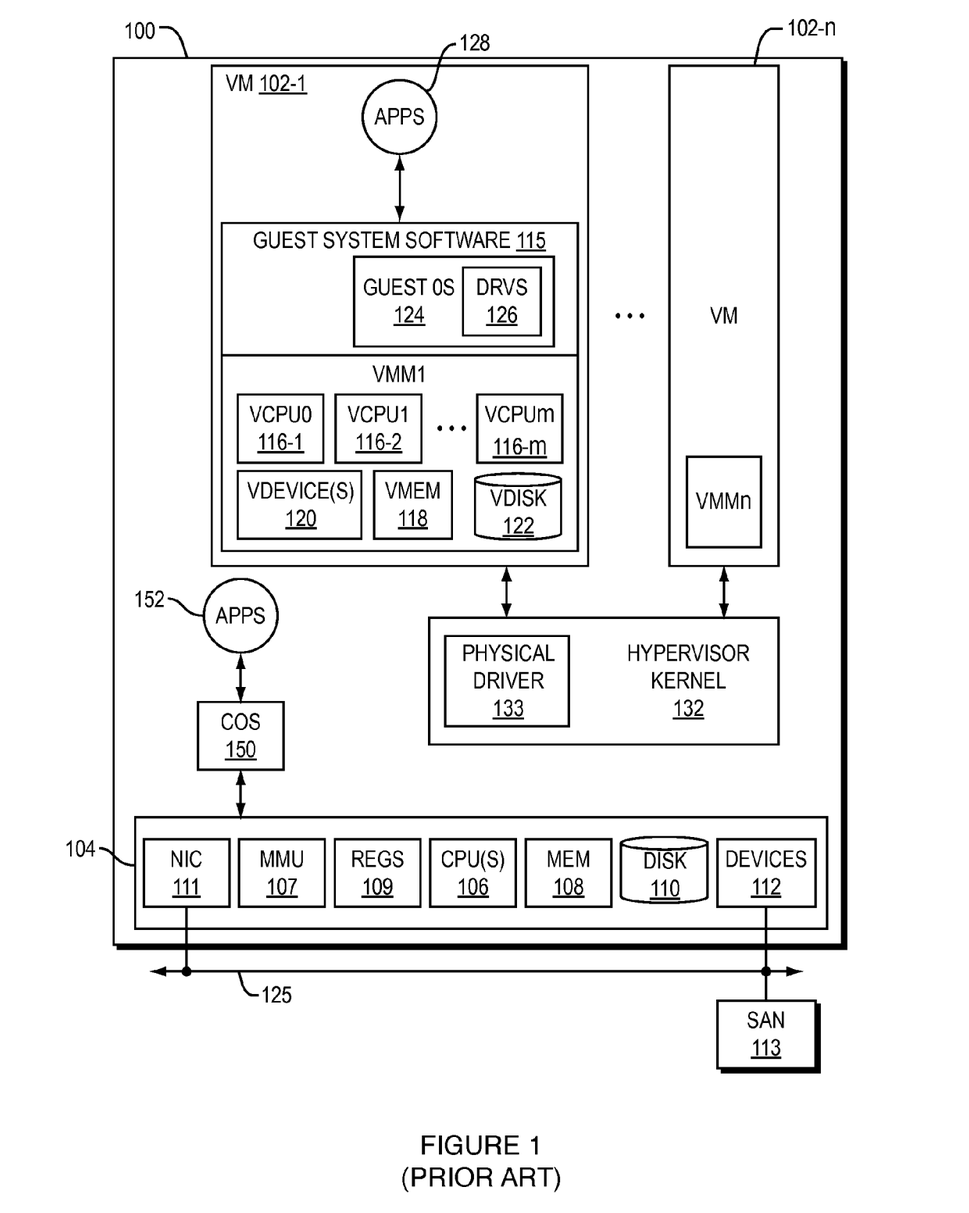
FIG. 1 is an illustrative drawing showing one possible arrangement of a computer system that implements virtualization.

FIG. 1 is an illustrative drawing showing one possible arrangement of a computer system 100 that implements virtualization. In the example system of FIG. 1, multiple virtual machines (VMs) sometimes referred to as "guests", VM1 to VMn, are installed on a physical host machine 104, often referred to as a "host," and one or more layers of co-resident software components comprising a virtualization intermediary, e.g. a virtual machine monitor (VMM), hypervisor or some combination thereof. Host machine system hardware typically includes one or more physical processors 106, physical system memory 108, and physical mass storage 110, which typically will include a disk system. The system memory 108 typically will comprise some form of high-speed RAM, whereas the mass storage 110 (e.g. one or more disks) will typically include a non-volatile, mass storage device. The system hardware 104 also ordinarily will include other conventional mechanisms such as a memory management unit MMU 107, various registers 109 and a network connection device 111 (such as a network adapter or network interface card ('NIC') to transfer data between the various components of the system and a network 125, which may be any known public or proprietary local or wide-area network such as the Internet, or an internal enterprise network. The host system hardware 104 also may include devices (only one shown) such as an IO storage adapter device 112 to perform protocol conversions required to access storage and to coordinate concurrent accesses to such storage, such as a storage access network (SAN) 113 which requires access over the network 125.

Each virtual machine VM1 to VMn typically will have both guest system software 115 and virtual system hardware, which typically includes one or more virtual CPUs (VCPUs) 116-1 to 116-$m$, virtual system memory 118, at least one virtual disk 122, and one or more virtual devices 120. The virtual hardware components of the virtual machine may be implemented in software using known techniques to emulate the corresponding physical components. The guest system software includes guest operating system (OS) 124 and virtual drivers 126 as needed for the various virtual devices 120.

As is well known to persons skilled in the art, a typical device driver is a computer program based component that runs on (i.e. configures) a machine (e.g. host computer) and acts as a translator between a physical device and the applications or operating systems that use the device. A device driver typically accepts generic high-level commands and breaks them into a series of low-level device-specific commands as required by the device being driven. A virtual driver 126 is a computer program based component that that runs on a host computer and performs the same role as a physical driver except that it configures a machine (e.g. host computer) to provide translation between a virtual device 120 that provides hardware emulation and that runs within a VMM and/or the guest operating system 124, for example. Furthermore, drivers (virtual or physical) can provide a level of security as they can run in kernel-mode, thereby protecting the operating system from applications running in user-mode.

In many cases, software applications 128 running on a virtual machine, e.g., VM1, will function as they would if run on a "real" computer, even though the applications are running at least partially indirectly, that is via guest OS 124 and virtual processor(s). Executable files will be accessed by the guest OS from virtual disk 122 or virtual memory 118, which will correspond to portions of an actual physical disk 110 or storage on the SAN 113 or memory 108 allocated to that virtual machine.

A software component referred to herein as a 'virtualization intermediary' serves as an interface between the guest software within a virtual machine and the various hardware components and devices in the underlying hardware platform. The virtualization intermediary may include VMMs, a hypervisor (also referred to as a virtualization "kernel") or some combination thereof. Because virtualization terminology has evolved over time and has not yet become fully standardized, these three terms do not always provide clear distinctions between the software layers and components to which they refer. In some systems, some virtualization code is included in at least one "superior" virtual machine to facilitate the operations of other virtual machines. Furthermore, specific software support for virtual machines may be included in the host OS itself. For example, the term 'hypervisor' often is used to describe both a VMM and a kernel together, either as separate but cooperating components or with one or more VMMs incorporated wholly or partially into the hypervisor itself to serve as a virtualization intermediary. However, the term hypervisor also is sometimes used instead to mean some variant of a VMM alone, which interfaces with some other software layer(s) or component(s) to support the virtualization.

A hypervisor portion of a virtualization intermediary comprises a software layer implemented to manage physical resources, process creation, and I/O stacks, and includes physical device drivers 133 (only one shown) that serve as an interface to host system devices such as the IO storage adapter 112. Under such an implementation, the hypervisor 132 would manage the selections of physical devices and their temporary assignments to virtual devices. A host computer system may run multiple virtual machines (VMs) that share common resources such as physical storage. A virtualization intermediary manages interaction between VMs and physical storage. Some prior virtualization intermediaries "trap" (intercept) virtual storage requests issued by individual VMs and redirect the requests from virtual targets to physical targets. Such earlier virtualization intermediaries use trap handlers during emulation to redirect IO commands to prevent storage access violations.

For example, a hypervisor kernel 132 portion of a virtualization intermediary would manage the mapping between VM1-VMn and their virtual processors 116-1 to 116-$m$, virtual memory 118, and the physical hardware devices that are selected to implement these virtual devices. More particularly, when a virtual processor is dispatched by a VM, a physical processor, such as one of the physical processors 106, would be scheduled by the hypervisor 132 to perform the operations of that virtual processor. In contrast, in the context of such implementation, the virtual machine monitors, VMM1-VMMn, would be responsible for actually executing commands on physical processors, performing binary translation (BT) or programming of virtual hardware, for example. Note that in some embodiments, the VMM is 'instanced' meaning that a separate instance of the VMM portion of the virtualization intermediary is created for each VM. Thus, although in this example, such a hypervisor and a VMM may be distinct, they would work together as a virtualization intermediary. Unless otherwise indicated, the term 'virtualization intermediary' encompasses any combination of VMM and hypervisor (or hypervisor kernel) that provides a virtualization layer between a guest OS running on VMs and the host hardware.

In the system of FIG. 1, the virtual machine monitors VMM1 to VMMn are shown as separate entities from the hypervisor kernel software 132 that run within VM1 to VMn, respectively. The VMMs of the system of FIG. 1 emulate virtual system hardware. While the hypervisor kernel 132 is shown as a software layer located logically between all VMs and the underlying hardware platform and/or system-level host software, it would be possible to implement at least part of the hypervisor layer in specialized hardware. The illustrated embodiments are given only for the sake of simplicity and clarity and by way of illustration since, as mentioned above, the distinctions are not always so clear-cut. Again, unless otherwise indicated or apparent from the description, it is to be assumed that one or more components of the virtualization intermediary can be implemented anywhere within the overall structure of such virtualization intermediary, and may even be implemented in part with specific hardware support for virtualization.

The various virtualized hardware components of the VM1, such as VCPU(s) 116-1 to 116-$m$, virtual system memory 118, virtual disk 122, and virtual device(s) 120, are shown as being emulated within VMM1, which runs within virtual machine VM1. One advantage of such an arrangement is that the virtual machine monitors VMM1 to VMMn may be set up to expose "generic" devices, which facilitate VM migration and hardware platform-independence. For example, the VMM1 may be set up to emulate a standard Small Computer System Interface (SCSI) disk, so that the virtual disk 122 appears to the VM1 to be a conventional SCSI disk connected to a conventional SCSI adapter, whereas the underlying, actual, physical disk 110 may be something else. The term "disk" as used herein signifies persistently stored data addressed in sequence, typically from address zero to address max capacity−1. A SCSI driver typically would be installed into the guest OS 124 as one of the virtual drivers 126. A virtual device 120 within the VMM then would provide an interface between VM1 and a physical device driver 133 within the hypervisor kernel 132 that serves as an interface to a physical device (e.g., device 112) that is part of the host system and would handle disk operations for the VM1.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest OS other than those that would be found in a non-virtualized computer; thus, the guest OS 124 could be an off-the-shelf, commercially available OS with no components included specifically to support use in a virtualized environment.

In contrast, another term, which has yet to achieve a universally accepted definition, is "para-virtualization." As the term implies, a "para-virtualized" system is not "fully" virtualized, but rather the guest is specially configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, some para-virtualized systems include an interface within the guest that enables explicit calls to other components of the virtualization software.

For some, the term para-virtualization implies that the guest OS (in particular, its kernel) is specifically designed to support such an interface. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration. In a hosted virtualized computer system, an existing, general-purpose operating system forms a "host" OS that is used to perform certain input/output (I/O) operations, alongside and sometimes at the request of the VMM.

The system of FIG. 1 is an example of a non-hosted configuration in which VMMs are deployed on top of a software layer—hypervisor kernel 132—constructed specifically to provide an interface for the virtual machines. Kernel 132 also may handle any other applications running on it that can be separately scheduled, as well as a console operating system 150 that, in some architectures, is used to boot the system and facilitate certain user applications 152 used to interact with the virtualization software.

PCI SR-IOV

Many modern computing devices employ input/output (IO) adapters and buses that utilize some version or implementation of the Peripheral Component Interconnect (PCI) standard, which specifies a computer bus for attaching peripheral devices to a computer motherboard. PCI Express (PCIe) is an implementation of the PCI computer bus that uses existing PCI programming concepts, but bases the computer bus on a different and much faster serial physical-layer communications protocol. In addition to the PCI and PCIe specifications, the PCI-SIG has defined input/output virtualization (IOV) standards for defining how to design an IO adapter that can be shared by several virtual machines.

The term "function" is used in the PCI context to signify a device with access controlled by a PCI bus. A PCI function is identified within a single PCI root complex by its PCI or PCIe bus, device, and slot identifiers. A PCI function includes a configuration space, which includes both device dependent and device independent regions used by host software to support device relocation on the PCI bus, flexible device-to-interrupt binding, device identification, and device configuration. A function also includes memory space which is identified by Barrier Address Registers in configuration space and provides a memory mapped IO interface for host IO initiated from host to the device. A PCIe function also includes message space which can be identified by MSI and MSI-X capabilities in configuration space and provides either or both MSI/MSI-X message based interrupt generation. Many network (e.g., Ethernet) and storage (e.g., disk) adapters are implemented as PCI or PCIe compliant adapters and are recognized by a machine's PCI sub-system as a single PCI function. Multi-port PCI or PCIe adapters simply appear to a host PCI sub-system as multiple PCI functions.

Figure 2:
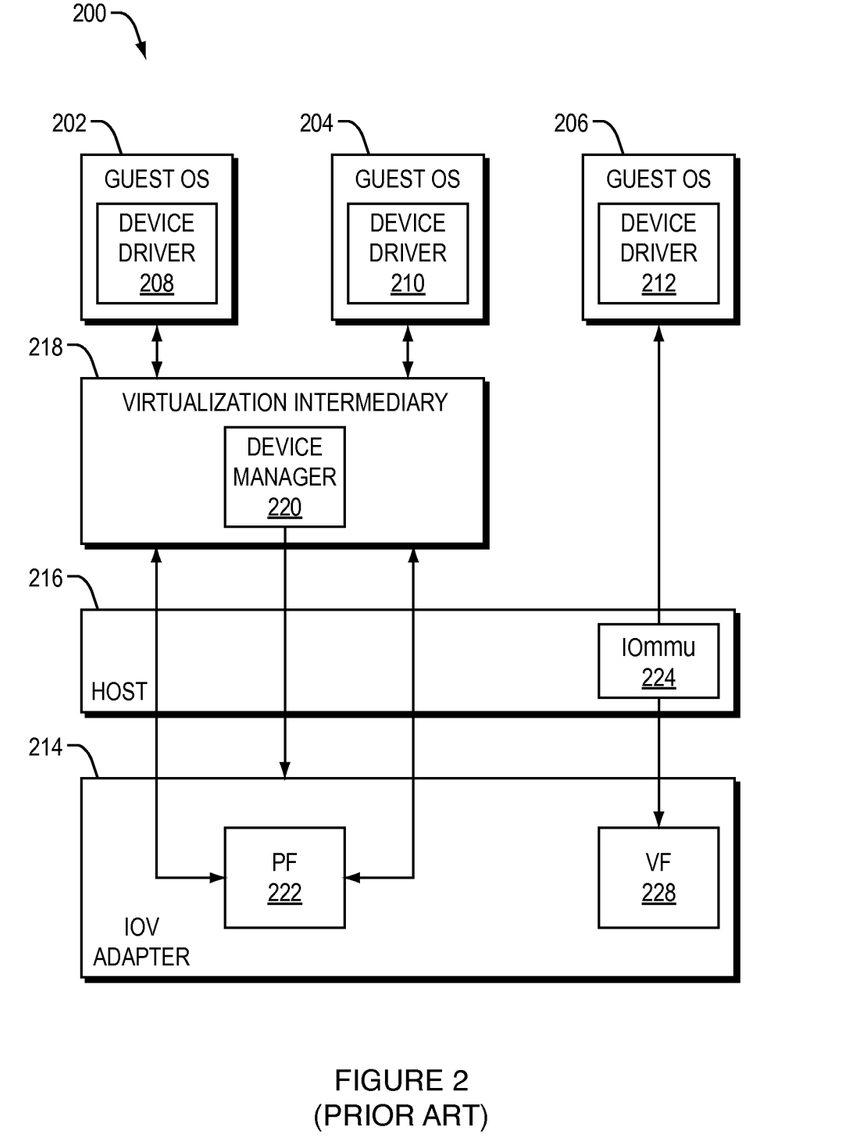
FIG. 2 is an illustrative drawing of a virtualized system including SR-IOV virtualization.

FIG. 2 is an illustrative drawing of a virtualized system 200 including SR-My virtualization. Techniques specified in the PCI SR-IOV specification can be used to reduce the CPU impact of high throughput workloads by bypassing the virtualization intermediary. The term 'single root' refers to a single root complex as contrasted with a multiple root complex. In a PCI Express system, a root complex device couples the processor and memory subsystem to a PCI Express switch fabric comprised of one or more switch devices. The root complex generates transaction requests on behalf of the processor, which is interconnected through a local bus.

The illustrative system includes VMs 202, 204 and 206, each independently running a separate (and possibly different) guest operating system. A virtualization intermediary layer 218 runs between the virtual machines 202 and 204 and a host machine 216. Device driver 208 of VM 202 and device driver 210 of VM 204 each drives a physical function (PF) 222, with intervention by the virtualization intermediary 218. Device driver 212 of VM 206 drives a virtual function (VF) 228, without intervention by the virtualization intermediary 218. The device driver 212 communicates with IO MMU logic 224 disposed on the host machine 216 in the course of data access to data with mass storage (not shown). A device manager 220 within virtualization intermediary 218 manages the allocation and de-allocation of VFs for the SR-IOV adapter 214. The IOV adapter 214 provides a memory-mapped input/output interface for IO and provides an interface for controlling VFs.

A typical IOV adapter includes processor, memory and network interface resources (not shown) to implement the PF and one or more virtual functions VFs. A PF is a PCIe function that supports the SR-IOV capabilities defined in the PCI SR-IOV specification. A PF is used to control the physical services of the device and to manage individual VFs.

A VF is a PCIe function which is associated with a particular physical function and shares physical PCI adapter resources (e.g., ports, memory) with that physical function and other virtual functions located on the same physical adapter. A virtual function has its own PCI configuration space, memory space, and message space separate from other physical or virtual functions on that same adapter. A physical function, such as PF 222 in this example that is associated with a virtual function 228 is responsible for allocating, resetting, and de-allocating that virtual function and the PCI resources required by that virtual function. In general, a VF can either be accessed via a virtualization intermediary or bypass the virtualization intermediary to be directly accessed by a guest OS. In the example system 200, VMs 202, 204 respectively access PF 222 via the virtualization intermediary 218, and VM 206 accesses VF 214 directly, i.e. without intervention by the virtualization intermediary 218. Thus, a VF can be a direct sink for I/O and memory operations of a VM, i.e., without run-time intervention by a virtualization intermediary. The VF also can be a source of Direct Memory Access (DMA), completion, and interrupt operations to a VM.

SCSI Command Protocol

The International Committee for Information Technology Standards (INCITS) T10 Technical Committee has adopted a layered approach that divides the Small Computer System Interface (SCSI) into multiple layers of standards. The lowest layer refers to physical interfaces that are sometimes referred to as physical transports. The next layer up pertains to transport protocols usually directly associated with one physical transport standard. The top layer consists of command sets associated with specific devices such as disk drives or tape drives, for example. See, J. Lohmeyer, SCSI Standards Architecture, Business Briefing: Data Management & Storage Technology 2003. A result of this layered approach to the SCSI standard is that there are over 30 SCSI standards. In general, only a few of these standards apply to a given product. As used herein, the term 'SCSI' signifies compliance with one or more of these SCSI standards.

A SCSI command is a request describing a unit of work to be performed by a device server. A SCSI command descriptor block (CDB) is a structure used to communicate commands from an application client to a device server. The SCSI command set assumes an underlying request-response protocol. The fundamental properties of the request-response protocol are defined in SCSI Architecture Model (SAM)-3, Revision 14. Action on SCSI commands is not be deemed completed until a SCSI response is received. For example, a SCSI IO request may include a Read command or a Write command. If successful, the SCSI request results in the reading or writing of data. A SCSI IO response provides status information concerning the data transfer if successful or concerning error if unsuccessful. The SCSI IO response ordinarily includes a status that indicates the final disposition of the command. See, SCSI Primary Commands—3 (SPC-3), Revision 23, Section 4.2, The request-response model, May 4, 2005, American National Standards for Information Systems—InterNational Committee for Information Technology Standards. (hereinafter "SPC-3, Revision 23")

Figure 3A:
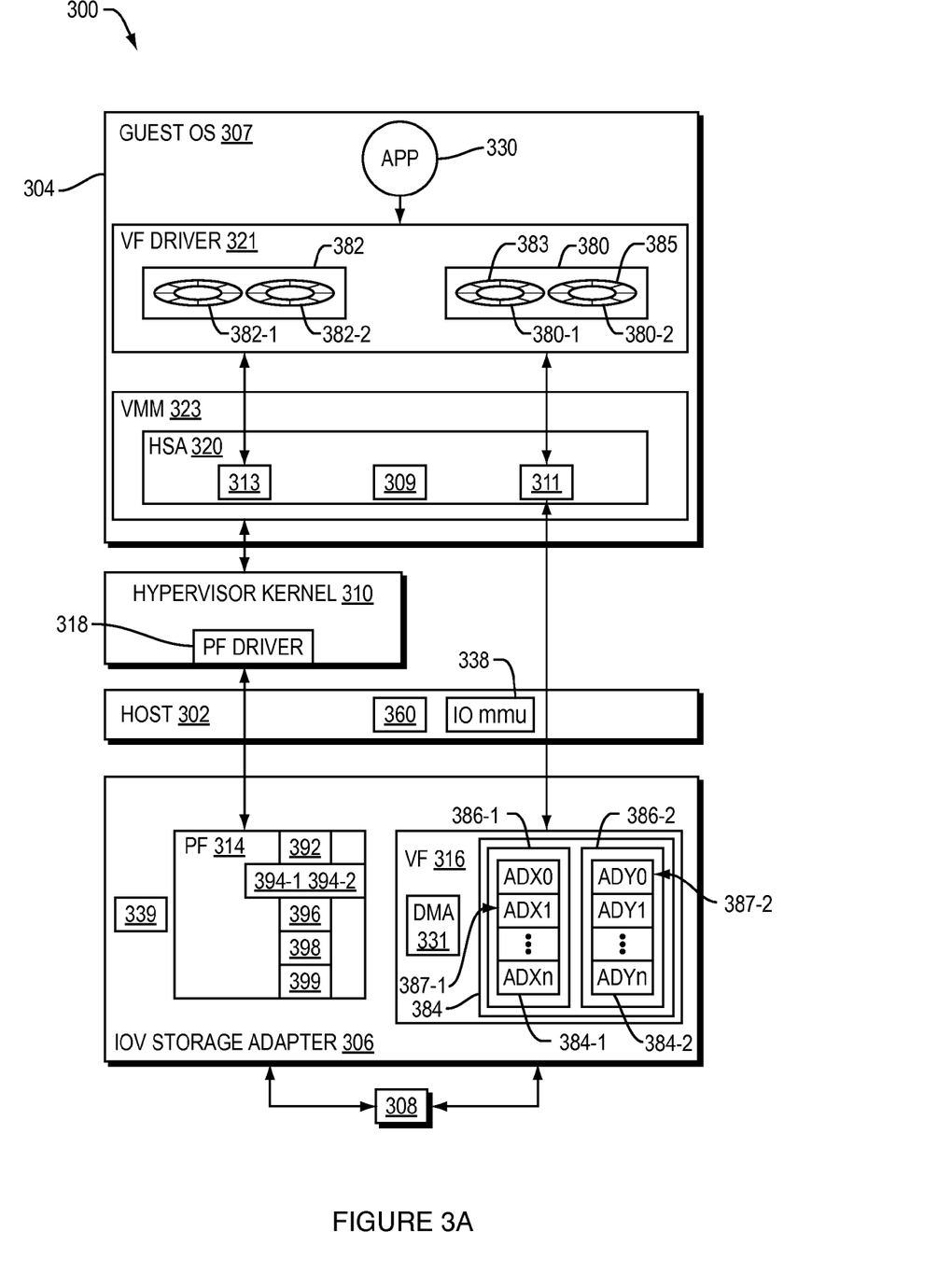
FIG. 3A is an illustrative drawing of a system that includes a host machine that hosts a virtual machine and that is coupled to an IOV storage adapter that adapts SCSI IO communications over a PCI bus protocol of the host machine to SCSI storage access protocols used to access persistent physical storage.

VM with Hybrid Storage Adapter to direct certain IO Operations to a Virtualization Intermediary and to Direct other IO operations to the VF FIG. 3A is an illustrative drawing of a system 300 that includes a host machine 302 that hosts a virtual machine 304 and that is coupled to an IOV storage adapter 306 that adapts IO communications over a PCI bus protocol of the host machine 302 to SCSI storage access protocols used to access persistent physical storage 308. The system 300 of FIG. 3A is an implementation that in general possesses much the same general type of configuration and component structures explained with reference to FIGS. 1-2 and in which the VM 304 is configured for direct-access (or 'passthrough' access) to physical storage 308 via the IOV storage adapter 306 without intervention of the virtualization intermediary (e.g. the VMM and hypervisor kernel) in accordance with the PCI SR-IOV specification. However, details are omitted from FIG. 3A so as to not obscure IOV features.

In some embodiments, the PCI bus protocol is compliant with both the PCI specification and the PCIe SR-IOV extension specification, and SCSI commands are used with one or more SCSI transport protocols such as iSCSI, SAS or Fibre Channel to directly communicate IO access requests (Read/Write) with persistent physical storage 308 such as SAN storage, for example. More particularly, the system 300 is configured to allow a virtual machine 304 to access physical storage 308 via IOV direct access for certain SCSI Read/Write CDBs and to allow access to physical storage 308 via a hypervisor kernel 310 for other SCSI CDBs. Specifically, certain frequently occurring SCSI I/O commands such as, SCSI-6, -10, -12, and -16 byte SCSI read and write commands, are directed over a direct IOV data path 315 coupling between the virtual machine 304 and a virtual function 316 substantially without involvement of the hypervisor kernel 310. The direct IOV data path 315 is referred to as 'direct' because it does not involve the hypervisor kernel 310 and has been referred to as the 'fast path' because it allows for faster access to storage 308 since it does not involve the hypervisor kernel 310. A set of control plane IO request/response queues shared with the virtualization intermediary are used for all other SCSI I/O, SCSI task management operations, and all other forms of non-SCSI fast-path related communication between the virtual adapter 306 and the hypervisor kernel 310.

The storage adapter 306 includes adapter resources 339 such as processor and memory devices (e.g., RAM, EPROM, FLASH or Disk) and network protocol translation and interface resources, which will be readily understood by persons skilled in the art, to implement a physical function (PF) 314 and the virtual function (VF) 316. Adapter resources 339 are configured to implement the physical function (PF) 314. The virtual function (VF) 316 is controlled e.g., created, deleted, enabled, disabled, quiesced, checkpointed and restored, through interaction between the hypervisor kernel 310 and the PF 314 via the PF driver 318. For example, in some embodiments the PF 314 provides access to local physical and virtual ports of the physical storage adapter 306. Moreover, in some embodiments, physical storage adapter management tasks (e.g., configuration, firmware download, core upload, diagnostics, hard reset, monitoring) and SCSI task management take place through the PF 314.

The PF driver 318 communicates information between the PF 314 and the hypervisor kernel 310. In the illustrative embodiment, the VF 316 is associated with virtual machine 304. A guest VF driver 321 communicates information with both the VF 316 and a hybrid storage adapter (HSA) 320 instantiated within a VMM 323 within the virtual machine 304. Although only one VM 304 and one corresponding VF 316 are shown and described herein, it will be appreciated that the host system 302 may host multiple VMs and the adapter 306 may implement multiple corresponding VFs, and the description herein would apply to each such combination of VM and VF. Multiple VFs (only one shown) may be instantiated within the adapter 306, and each respective virtual machine (only one shown) may be associated with a different respective VF to create respective IOV data paths for certain frequently occurring Read and Write SCSI IO commands.

The HSA 320 'appears' to be a physical PCI device (i.e. a physical storage adapter) from the perspective of the virtual machine 304. The HSA 320 acts as the virtual machine's interface to the physical storage world, i.e. to the physical storage adapter 306. The hybrid storage adapter 320 is an emulated PCI storage adapter within the VM 304, which encapsulates a PCI SR-IOV virtual function of an SR-IOV compliant physical storage adapter presented by the hypervisor kernel 310 within a protected memory space of the virtual machine. A PCI configuration space 309 of the virtual function 316 is copied to the HSA's PCI configuration space 309, so as to provide a memory mapped interface to a first HSA PCI memory space 311 that supports direct access to physical memory. The HSA 320, through the first PCI memory space, provides a direct access path to the guest OS 307 of the virtual machine 304 with the capability to issue IO requests directly to the physical adapter virtual function (VF) 316 without intervention by the hypervisor kernel 310. Although the HSA 320 is shown resident within a protected memory space of the virtual machine 304, it will be appreciated that it could instead reside within the hypervisor kernel 310. The HSA 320 is referred to as a 'hybrid' herein because it has two memory mapped interfaces 311 and 313.

In some embodiments, the HSA's PCI configuration space 309 also maps to a second HSA PCI memory mapped interface 313 that supports fully emulated processing of certain SCSI commands using the virtualization intermediary 310. Specifically, a virtual target emulation mapping (not shown) comprising first mapping metadata (not shown) associated with a VF 316 to map virtual SCSI logical units (i.e. virtual disks) to portions of physical SCSI logical units and second mapping metadata (not shown) to map virtual SCSI address two-tuple information (i.e. virtual SCSI target, virtual SCSI LUN) to virtual disks allocated to a given virtual machine. Commonly assigned patent application Ser. No. 12/689,152, invented by Goggin et al., filed Jan. 18, 2010, entitled, Virtual Target Addressing During Direct Data Access Via VF of IO Storage Adapter, which is expressly incorporated herein by this reference, discloses virtual target emulation mapping associated with the VF 316. Commonly assigned patent application Ser. No. 12/689,162, invented by Goggin et al., filed Jan. 18, 2010, entitled, Configuring VM and IO Storage Adapter VF for Virtual Target Addressing During Direct Data Access, which is expressly incorporated herein by this reference, discloses a method to configure such virtual target emulation mapping with a VF that is associated with a VM.

In other alternative embodiments, for each physical SCSI disk exposed to the VF 316 on the physical SAN 308, there may be multiple physical SCSI paths existing to the physical SCSI disk of which only a subset may be active at any point in time. Commonly assigned patent application Ser. No. 12/731,265, invented by Aswani et al., filed Mar. 25, 2010, entitled Virtualization Intermediary/Virtual Machine Guest Operating System Collaborative SCSI Path Management, which is expressly incorporated herein by this reference, discloses a path management layer in a storage stack (not shown) within the hypervisor kernel 310 that performs several functions. The path management layer performs functions such as discovery of the physical paths to SCSI devices, collapsing multiple physical paths to a SCSI device, keeping track of the active path to a SCSI device, ensuring that IO coming from the software layers above it is routed to the correct path for a SCSI device, and changing the active path based on certain path selection and/or load balancing policies, for example.

In some embodiments, the hypervisor kernel 310 is implemented as the 'ESX' hypervisor produced by VMware, Inc. having a place of business in Palo Alto, Calif. The ESX hypervisor serves as a virtualization intermediary having both VMM and hypervisor kernel functionality. Each VM (e.g. virtual machine 304) runs on top of ESX. In an ESX environment, a portion of each VM comprises a VMM. That is, VMMs are embedded in the VM's address space, albeit in a protected region. In some embodiments, the hybrid storage adapter 320 also resides in a protected memory space of the VM, and more particularly, runs within the context of the VMM that is embedded in that VM's memory space. If a given VM has multiple virtual processors (VCPUs), then each virtual processor has an associated VMM. In an ESX environment, the VMM/hypervisor virtualization intermediary serves as the primary memory management component to manage multiple simultaneously running VMs.

The guest VF driver 321 is savvy as to the hybrid nature of the HSA 320, and as such is a 'para-virtual' device driver. The guest VF driver 321 directs certain SCSI IO operations, such as certain data IO operations, to the first HSA PCI memory space 311 for direct access to physical storage 308 via the VF 316. As explained above, the guest VF driver 321 directs other SCSI operations, such as certain control IO operations, to the second HSA PCI memory space 313 for fully emulated processing by the hypervisor kernel 310. More particularly, in some embodiments during runtime operation, the VF driver 321 directs only certain SCSI storage access (e.g. Read/Write) commands to the first HSA memory space 311 and directs all other SCSI commands to the second HSA memory space 313.

The VF driver 321 allocates a portion of host memory 360 to one or more first IO queues 380 (referred to herein as the 'first queue') that contain SCSI requests/responses that are communicated with the VF driver 320 over the first HSA memory space 311, which provides direct access to physical storage 308. Typically, the first queue 380 comprises one or more circular SCSI IO request queues 380-1 and one or more circular SCSI IO response queues 380-2. The VF driver 321 also allocates a portion of host memory 360 to one or more second queues 382 (referred to herein as the 'second queue') that contain information that is directed by the VF driver 320 to the second HSA memory space 313 for emulated access to physical storage 308. Generally, the second IO queue 382 comprises one or more circular request queues 382-1 and one or more circular response queues 382-2 that are used for SCSI IO operations other than certain SCSI IO Reads and Writes. Requests in the first or second IO queues 380, 382 comprise queued requests to be sent to storage 308. Responses in the first or second IO queues 380, 382 comprise responses received from storage 308 that are queued for processing by the guest OS 307.

More particularly, the first HSA memory space 311 enables access to the first request queue 380-1 and the first response queue 380-2 through a storage device memory within the VF 316 configured to implement VF registers 384 that contain queue metadata state information 386-1, 386-2 indicative of the structure and state of these queues 380-1, 380-2, respectively. For example, in some embodiments, the first SCSI IO request queue 380-1 includes a sequence of first slots 383 having slot addresses ADX0 to ADXn, each of which may contain a SCSI IO request, and the first SCSI IO response queue 380-2 includes a sequence of second slots 385 having slot addresses ADY0 to ADYn, each of which may contain a SCSI IO response. In some embodiments, first metadata 386-1 includes a first index 387-1 into a sequence of locations (ADX0-ADXn) of a register 384-1 that correspond to and, therefore, are indicative of first slot addresses locations 383 in the first request queue 380-1. A current value of the first index 387-1 is indicative of where a next request to be de-queued by the VF 316 is located. Similarly, in some embodiments, second metadata 386-2 includes a second index 387-2 into a sequence of locations (ADY0-ADYn) of a register 384-2 that correspond to and, therefore, are indicative of second slot address locations 385 in the first response queue 380-2. A current value of the second index 387-2 is indicative of where a location in the second request queue 380-2 where a next response received from storage 308 is to be placed by the VF 316.

In some embodiments, when the VF driver 321 issues a SCSI IO Read or Write request, it adds the request to the next open slot in the first SCSI IO request queue 380-1. The VF driver 321 informs the VF 316 of the new request via the first HSA memory space 311, and the VF 316 increments the first index 387-1 to the indicate the first slot location of the newly added IO request in the first request queue 380-1 that is to be processed by the VF 316. Conversely, when the VF 316 receives a SCSI IO response directed to the first response queue 380-2, for example, VF 316 fills the response to a second slot 385 indicated by the second index 387-2. The VF 316 then increments the second index 387-2 so that a next-received response will be added to a next slot in the first response queue 380-2. Thus, in some embodiments, the first HSA memory space 311 maps to queue metadata state information 386-1 and 386-2 within the VF 316 that is indicative of the structure and state of the first SCSI IO request queue 380-1 and of the first SCSI IO response queue 380-2, respectively, and thereby provides a direct path (i.e., a path that is not intermediated by the hypervisor kernel 310) between the first queue 380 associated with the VM 304 and storage 308.

In some embodiments, dispatch of an IO request from the first request queue 380-1 to storage 308 occurs as follows. An application 330 running on the virtual machine 304 issues a Read/Write access request to the guest OS 307. The VF driver 321 assembles a SCSI IO request. In some embodiments, the SCSI IO request comprises an IO Dispatch Control Block containing amongst other information an embedded SCSI command data block (CDB) for the read/write operation and addresses. The VF driver 321 places the Block on the first request queue 380-1 for access by the VF 316. The VF driver 321 notifies the VF 316 of the addition of the new Dispatch Control Block on the first request queue 380-1 via the first HSA PCI memory space 311, causing register 384 to increment a request state value (e.g. the index 387-1) of the first metadata 386-1 to point to an address indicative of the location of the newly added Block within the first request queue 380-1 and causing the VF 316 of the adapter 306 to de-queue the Block, and send it to the storage target 308. Subsequently, the target storage 308 provides a corresponding SCSI IO response.

In some embodiments, input of a SCSI IO response received from storage 308 to the first SCSI IO response queue 380-2 proceeds as follows. If the SCSI IO request involves a Read then data is retrieved from physical storage 308. If the SCSI IO request involves a write, then data is written to physical storage 308. After the SCSI IO request (Read or Write) has been successfully performed, the VF 316 inserts the new Completion Control Block to the first response queue 380-2 at a second slot address location indicated by a state value (e.g. the index 387-2) of the second metadata 386-2, and then increments the state value (e.g. the index 387-2) of the second metadata 386-2 to indicate a next slot location in the first response queue 380-2 where a next received completion is to be inserted. The VF 316 notifies the VF driver 321 of the addition of the new Completion Control Block to the first response queue 380-2. Commonly assigned patent application Ser. No. 12/689,152 identified above and incorporated by reference, describes dispatch of a virtual SCSI IO storage request and processing of a response to a virtual IO request.

Commonly assigned patent application Ser. No. 12/687,999, filed Jan. 15, 2010, invented by Subramanian et al., entitled, Guest/Hypervisor Interrupt Coalescing for Storage adapter Virtual Function in Guest Passthrough Mode, which is expressly incorporated herein by this reference, discloses an interrupt coalescing technique that can be employed in the course of access to the first queue 380. For example, when interrupt coalescing is utilized, the VF 316 may be delayed in notifying the VF driver 321 of the presence of new completions in the first response queue 380-2 until multiple completions have been added to the first completion queue 380-2. As explained in application Ser. No. 12/687,999, interrupts that would have caused the VF driver 321 to process the completions as they were received are coalesced for some delay duration. However, even though interrupts are being coalesced, the response state value 386-2 (e.g. index 387-2) is incremented upon the arrival of each additional completion added to the first response queue 380-2 to keep track of the number of completions received. When an interrupt finally is sent to the VF driver 321 to notify it of the presence of one or more new completions in the first response queue 380-2 to be consumed, it will consume all completions in the first response queue 380-2 up to the most recently incremented index value 387-2 of the response state value 386-2.

The actual data that is read from or written to storage 308 may comprise a plurality of data packets. During a read, the completion queue 334 of the VF 316 receives the data packets from the storage region 308 and causes the received data to be sent to the DMA logic 331 within the adapter 306. The DMA logic 331 cooperates with IO MMU logic 338 within the host machine 302, to read the data directly into a memory space of host machine physical memory (not shown) that has been allocated to the virtual machine 304 for the application 330 that originally requested the data.

Overview of VM Migration from Source Host to Destination Host

Figure 4:
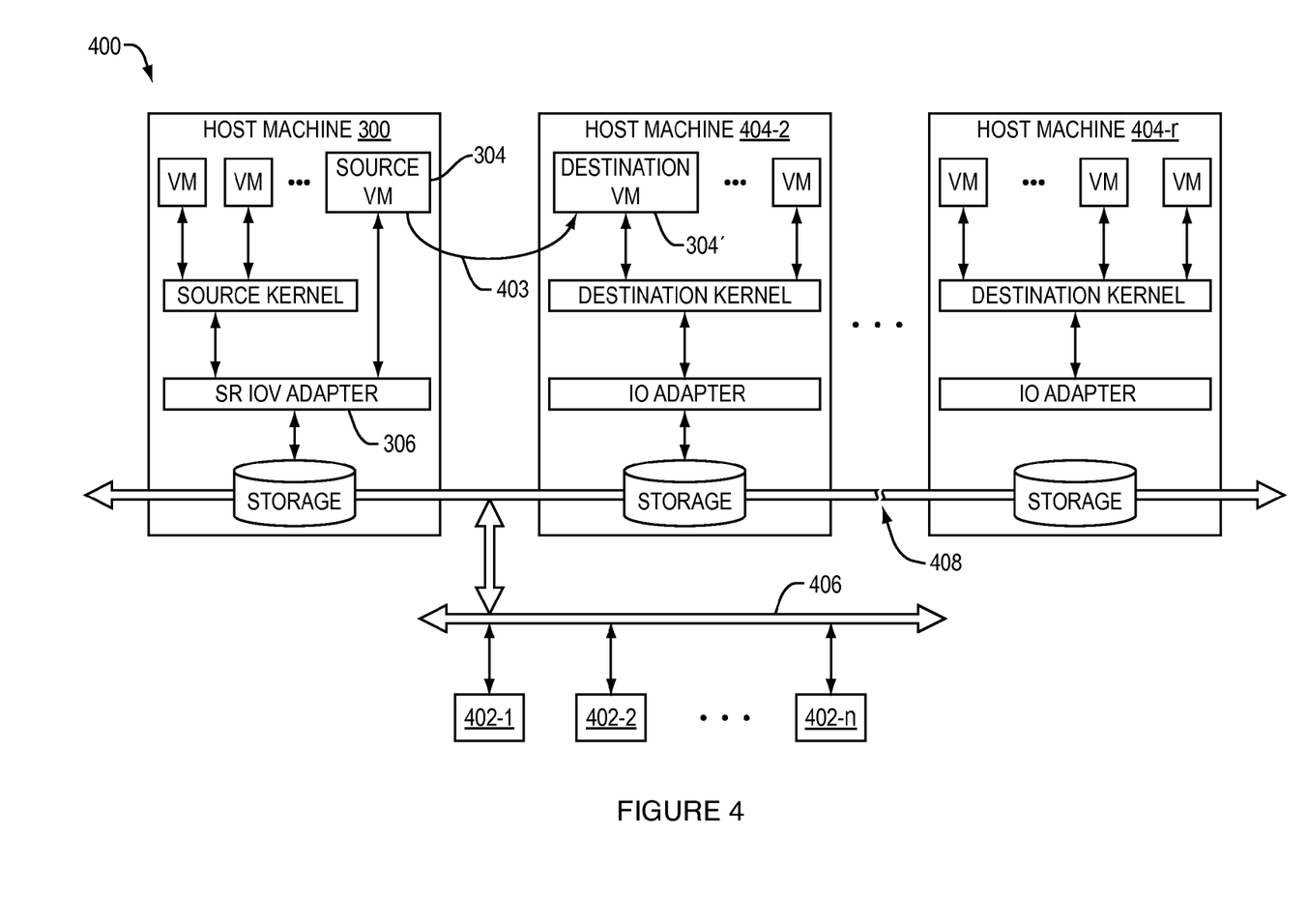
FIG. 4 is an illustrative drawing of interconnected servers (a 'server farm') in accordance with some embodiments with each server hosting a plurality of virtual machines.

Commonly assigned U.S. Pat. No. 7,680,919, invented by M. Nelson, issued Mar. 16, 2010, entitled, Virtual Machine Migration, describes a 'farm' of host machines, referred to as 'servers', each of which may host one or more virtual machines (VMs), as well as mechanisms for migrating a VM from one server (the source server) to another (the destination server) while the VM is still running. FIG. 4 is an illustrative drawing of a farm of interconnected servers (a 'server farm') 400 in accordance with some embodiments, with each server hosting a plurality of virtual machines. The general configuration of the server farm 400 includes a plurality of user machines 402-1 and 402-2 . . . 402-n that access a farm of host machines (i.e. servers) 300, 404-1, . . . 404-r via a network 406. The server labeled 300 in FIG. 4 corresponds to the identically labeled system 300 of FIG. 3A in that it comprises VM 304 that is coupled for direct access to the SR IOV storage adapter 306. The resources of the servers 300 and 404-2 to 404-r are aggregated into one common resource pool. From the perspective of a user device, therefore, the 'server farm' 400 will appear to be one big machine with a large quantity of resources.

As indicated by arrow 403, VM 304 which runs on source machine 300 is relocated to destination machine 404-2 where it is instantiated as VM 304'. In some embodiments, VMs can be migrated only between machines that share storage where the VMs' disks reside. In the example server farm 400 of FIG. 4, in order to allow for inter-server migration, the host machines 300 and 404-2 to 404-r, therefore, either share an external, common storage system or can access each other's internal storage. This assumption eliminates the need to migrate entire disks. One way to arrange this is for all of the servers in the farm 400 to be connected via a system such as Fibrechannel. This is illustrated in FIG. 4 as the channel 408.

PF API to Manage VF During VM Live Migration

Referring again to FIG. 3A, the adapter resources 339 are further configured to provide PF application programming interface (API) that comprises PF API modules 392-399 used by the PF 314 to control the VF 316 in course of migration of the VM 304 from the source machine 300 to the destination machine 404-2 shown in FIG. 4 in accordance with some embodiments.

PF API module 392 sets a maximum number of outstanding IO requests for the VF 316. In some embodiments, this limit on the number of outstanding IO requests is enforced by the physical adapter 306 by not de-queuing a request from the first request queue 380-1 if the maximum number of requests for the VF 380-1 is already outstanding. Enforcing this limitation upon the maximum number can eliminate the need for an IO response queue overflow buffer on the migration-destination machine.

PF API modules 394-1 and 394-2 enable/disable either the first request queue 380-1 or the first response queue 380-2. Enabling the first request queue 380-1 causes the VF 316 to service the first request queue 380-1 if that queue 380-1 is non-empty. Enabling the first response queue 380-2 causes the VF 316 to add responses to the first response queue 380-2 if the first SCSI IO queue 380-2 is not full. The enable/disable capabilities of modules 394-1 and 394-2 are utilized to manage these queues during live migration when transitioning the first HSA PCI memory space 311 from direct storage access to emulated storage access on the migration-source machine.

In some embodiments, the VF 316 includes a VF request queue (not shown) in which IO requests are queued prior to being sent to the storage target 308. PF API module 396 flushes such IO requests from that queue (not shown). However, in other embodiments, such as the one illustrated herein, the VF 316 sends IO requests immediately, and therefore, IO requests are resident only momentarily on the VF 316, and as a result, in many cases there will be no IO requests to flush from the VF 316.

PF API module 398 obtains from the VF 306 the number of outstanding SCSI IO requests. A SCSI IO request is considered to be outstanding until a corresponding SCSI IO response containing a corresponding SCSI IO control block is queued to the first response queue 380-2, and any necessary DMA is complete for the IO pages referred to by the IOCB. The outstanding SCSI IO request count is used during the live migration to determine when it is safe to re-map the first HSA PCI memory space 311 from direct storage access to emulated storage access on the migration-source machine.

PF API module 399 saves a snapshot of the metadata device state 386-1, 386-2 from the registers 384 of the VF 316. An error is returned if the VF 316 is enabled to access either the first request queue 380-1 or the first response queue 380-2. These capabilities are utilized during live migration in order to maintain the state of the first request queue 380-1 and the first response 380-2 queue when re-map the first HSA PCI memory space 311 from direct storage access to emulated storage access in the course of migrating a virtual machine from migration-source to migration-destination machines.

Quiesce In-Flight IO on the VF Device Interface via the PF API

Referring again to FIG. 4, live migration of a virtual machine, such as VM 304, from the source host machine 300 to the destination host machine 404-2 involves temporarily suspending all operation of the VM 304 in the course of the migration. Graceful migration of the VM 304 involves suspending its operation in a manner such that operations of the VM 304 are not disrupted despite the temporary suspension of its operation. In accordance with some embodiments, when a VM 304 is relocated in the course of a direct storage access via a VF 316, precautions are taken to avoid loss of SCSI IO requests and/or SCSI IO responses that may be in flight during the time interval when the VM operations are temporarily suspended.

Figure 5:
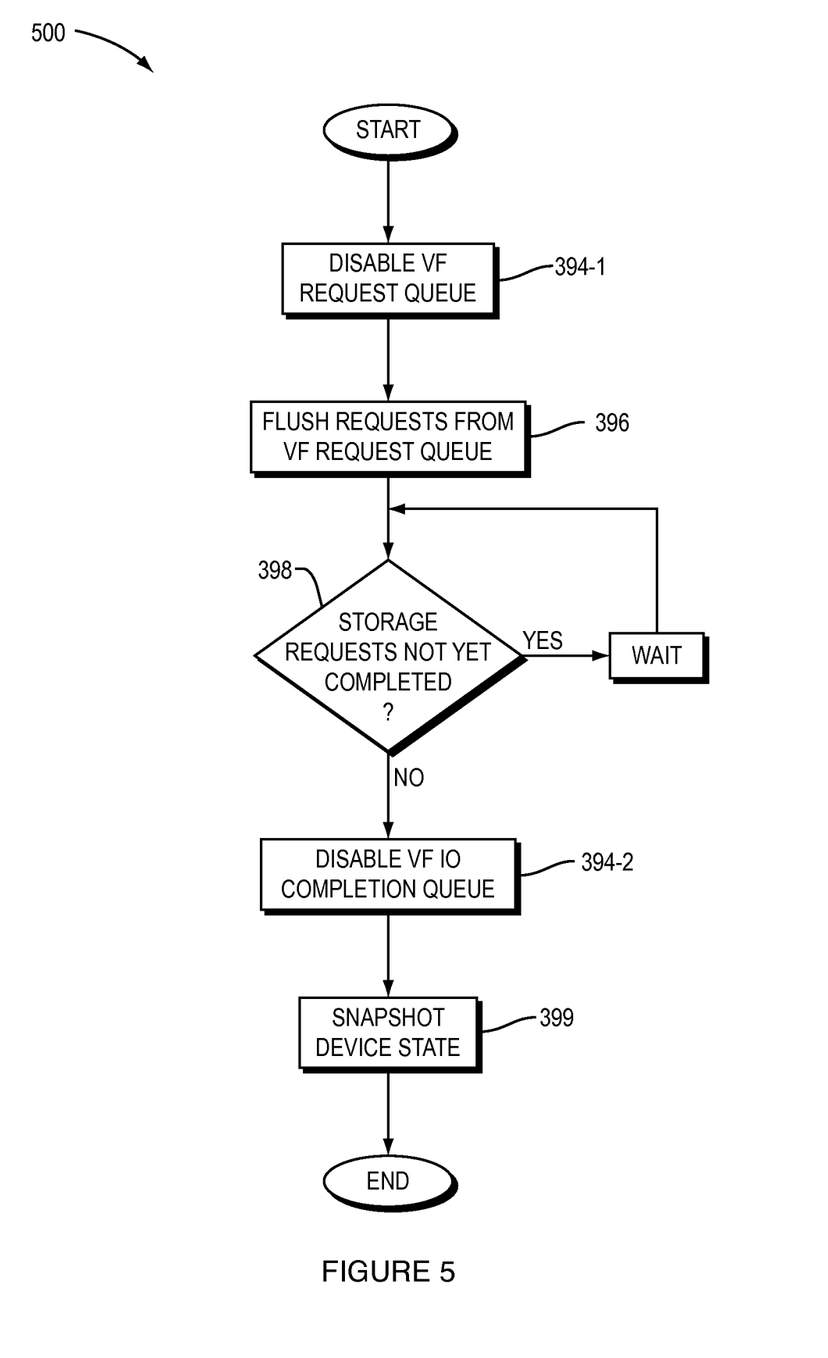
FIG. 5 is an illustrative drawing of a process to inactivate SCSI IO storage access via VF in the course of the relocation of a VM shown in FIG. 4 from a source server to the destination server.

FIG. 5 is an illustrative drawing of a process 500 to gracefully inactivate SCSI IO storage access via VF 316 in the course of the relocation of VM 304 shown in FIG. 4, from the source host machine 300 to the destination host machine 404-2. The process 500 ensures that no SCSI IO storage requests and no SCSI IO storage responses are lost in the course of the migration. Physical processing resources (not shown) of the physical adapter 306 that are implemented in hardware or firmware are configured to perform the specified function of each such module of the process 500.

As mentioned above, PF 314 includes module 392 that sets a maximum number of outstanding SCSI IO requests for the VF 316.

The process 500 calls module 394-1 which disables the VF 316 from attempting to de-queue any SCSI IO requests from the first SCSI IO request queue 380-1. Thus, operation of the first SCSI IO request queue 380-1 is suspended. The process 500 calls module 396 which flushes SCSI IO requests from the VF request queue 380-1, i.e. transmits the SCSI IO request to storage 308, to ensure that the VF request queue 380-1 is empty. The process 500 calls decision module 398, which determines whether the VF 316 has sent to physical storage 308 SCSI IO storage requests for which it has not yet received IO completions. If there are SCSI IO requests that the VF 316 previously de-queued from the first request queue 380-1 and sent to storage 308, but for which it has not yet received completions, then the decision module 398 awaits completions for all such outstanding SCSI IO storage requests. If there are no more outstanding SCSI IO requests, then process 500 control passes to module 394-2, which disables the IOs from being completed into queue 380-2. Next, module 399 saves a snapshot of the VF queue metadata device state 386-1, 386-2 from the registers 384 of the VF 316.

Re-Mapping from Direct Storage Access to Emulated Storage Access

Figure 3B:
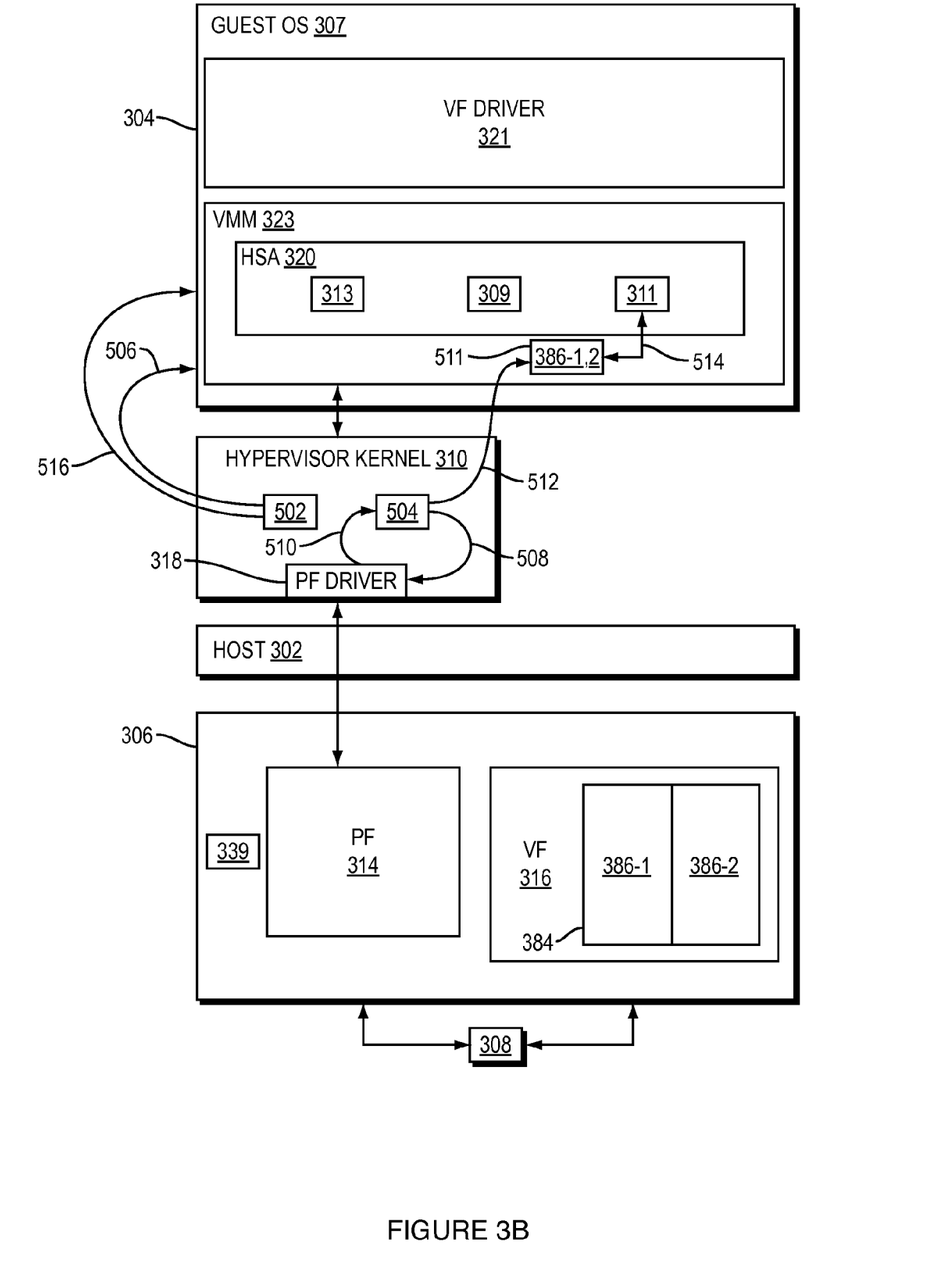
FIG. 3B is an illustrative structural flow diagram showing both operations and components involved in a process to gracefully inactivate SCSI IO storage access via a VF in the course of the relocation of VM from a source host machine to a destination host machine.

FIG. 3B is an illustrative structural flow diagram showing both operations and components involved in a process to gracefully inactivate SCSI IO storage access via VF 316 in the course of the relocation of VM 304 shown in FIG. 4, from the source host machine 300 to the destination host machine 404-2. The drawing of FIG. 3B represents the same system 300 shown in FIG. 3A with a re-mapping of the first HSA PCI memory space 311. FIG. 3B omits some components shown in FIG. 3A in order to simplify the drawing and also adds several modules used to inactivate SCSI IO storage access over the VF 316 and to achieve the re-mapping. Computer program code configures the host machine 302 to implement the component modules of FIG. 3B as components of the hypervisor kernel 310.

As indicated by arrow 506, a stun control module 502 within the hypervisor kernel 310 sends a message to the virtual machine 304 that 'stuns' the VM 304, i.e. halts execution of instructions so that it does not generate new SCSI IO requests for delivery to the VF 316 and so that it does not consume SCSI IO responses received by the VF 316 from persistent storage 308. As indicated by arrow 508, a state retrieval module 504 within the hypervisor kernel 310 sends a message to the PF driver 318 to request that the PF 314 obtain queue metadata state information 386-1, 386-2 for the first request queue 380-1 and the first response queue 380-2 from registers 384 of the VF 316. In response to the message from the module 504, the PF driver 318 sends a request to the PF 314 to retrieve the metadata state information 386-1, 386-2. In response to the request from the PF driver 318, the PF 314, which is a component of the adapter 306 runs the process 500 of FIG. 5 to obtain a snapshot of the state information 386-1, 386-2 from the registers 384 associated with the VF 316. The PF 314 passes the state information 386-1, 386-2 snapshotted from registers 384 to the PF driver 318. As indicated by arrow 510, the PF driver 318 in turn, passes the state information 386-1, 386-2 to the state retrieval module 504.

Also in response to the stun control message indicated by arrow 506 by stun control module 502, a memory region, particularly, a device state page 511 is allocated within VMM 323 (i.e. within a virtualization intermediary) to store the state information 386-1, 386-2 snapshotted (i.e. copied) from the VF registers 384. As indicated by arrow 512, module 504 saves to the device memory, i.e. state page 511, the device state information 386-1, 386-2 snapshotted from the VF registers 384. Moreover, in response to the stun control message indicated by arrow 506, the hypervisor kernel 310 causes a re-mapping of the first HSA PCI memory space 311 to point to the newly allocated device state page 511 as indicated by line 514.

Once the state information 386-1, 386-2 has been saved to the device state page 511 in the VMM 323 (i.e. within the virtualization intermediary), module 502 sends an unsuspend or 'unstun' message, indicated by arrow 516, to cause the VM 304 to resume execution of instructions. It will be appreciated that, alternatively, the stun and unstun of the VM optionally may not be performed since disabling the request queue ensures that no additional requests can be sent in the course of the re-mapping of the first HSA PCI memory space 311 to point to the newly allocated device state page 511 as indicated by line 514. In that alternative embodiment, snapshotting and re-mapping follow disabling of the VF 316 from attempting to de-queue SCSI IO requests from the first SCSI IO request queue 380-1.

Following re-mapping (and resumption of operation in the case of use of stun/unstun of the VM), however, the first HSA PCI memory space 311, which has been re-mapped, maps SCSI IO requests/responses to the device state page 511, which is within the VMM 323 and which contains the snapshotted state information 386-1 and 386-2. After the transfer of the state information 386-1, 386-2 to the device state page 511, the hypervisor 310 intervenes in the processing of such SCSI IO requests so as to provide emulated processing of such requests/requests.

The hypervisor 310 (part of the virtualization intermediary) intervenes in de-queuing of requests from the first request queue 380-1 and in transmitting the de-queued requests to the physical storage 308. The hypervisor 310 also intervenes in inserting responses received from the physical storage 308 to the first response queue 380-2. In the course of intervening, the hypervisor 310 may trap IO requests and IO responses and related instructions so as to be able to stop the VM 304 from operating on the source machine 300 at any instruction boundary and save processing state so that the processing state can be transferred to the destination machine 404-2 'transparently' and 'seamlessly' without loss of information. More particularly, since the hypervisor 310 can trap instructions and save state information, it can in effect control the flow of guest OS initiated IO during live migration, e.g. track and quiesce guest OS initiated on the source machine 300 and also can resume the IO on the destination machine 404-2. Thus, it will be appreciated that through the process described with reference to FIG. 3B, the hypervisor kernel 310 becomes interposed between the VM 304 and storage 308 so that it can readily control the process of migrating the VM 304 from the source machine 300 to the destination machine 404-2.

Migration of VM Following Snapshotting, Restoring and Remapping

Following storage of the device state 386-1 and 386-2 to page 511 and remapping of the first HSA PCI memory space 311 to that page 511, indicated by arrow 514, VM migration then proceeds generally as described in U.S. Pat. No. 7,680,919, which is expressly incorporated herein by this reference. In preparation for VM migration in order to minimize the down time for the running source VM 304 during the migration process, the destination VM 304' shown in FIG. 4 is powered on in the destination machine 400-2 and is put into a wait state. Memory pages are iteratively copied from the source VM 304 on the source host machine 300 to the destination VM 304' on the destination machine 404-2 while the source VM 304 is still running on the source machine 300.

In particular, once the destination VM 304' is ready, the source VM 304 is suspended long enough (using known techniques) that its non-memory state information can be transferred to and saved in the destination VM. The physical memory of the source VM 304 (that is, the contents of the virtual memory, which the VM views as physical memory) is dealt with differently than all other non-memory state information. This is because memory is too large to transfer all at once after the source VM 304 has suspended execution.

In some embodiments, as much physical memory as possible is transferred asynchronously while the source VM is running. A thread (not shown) is created, preferably in the source VM's VMM, whose job it is to push, that is, pre-copy, all of the source VM's memory over to the destination machine 404-2. The thread iterates through all physical pages and does at least the following: (a) The physical page number associated with the physical page is write-protected by the source VMM, using known procedures; and (b) The thread writes the page over to a destination machine kernel. The transferred pages include one or more pages (not shown) containing contents of the first request queue 380-1 and the first response queue 380-2 and the page 511 containing the state information 386-1, 386-2 pertaining to those queues 380-1, 380-2.

If any of the pages that were transferred are modified (the VMM detects this because a write-protect fault will be taken on the page), then the page is marked as modified. Marking may be done as simply—and compactly—as setting a bit in a table (or vector) for the modified page. Note that the first time the destination VM 304' touches any page that has not been copied to the destination machine, it will require a network page fault to the source machine 304; this fault is then used as a signal to immediately transfer the needed page. Once all pages have been transferred, the source VM 304 sends a list of modified pages to a kernel of the destination VM 304' so it knows that these pages need to be paged in from the source VM 304.

Thus, it also is possible to pre-copy the source VM's physical memory to the destination "iteratively," that is, over multiple "passes," before the non-memory state is transferred. According to this iterative memory transfer procedure, a first set (preferably all) of pages of the source VM's memory is pre-copied to the destination VM 304. During the time the memory is being transferred, however, the source VM 304, which is allowed to continue running, may modify some of the transferred pages. Modifications to the source VM's memory may be detected and tracked using any known method, such as a write-protection mechanism or a separate table indicating memory modifications. These modified pages are then re-transferred to the destination VM 304'. While they are being transferred, however, the source VM 304 may modify other pages (or even modify a previously modified page again). The newly modified pages are then retransferred, and so on.

The system repeats the iterative memory transfer procedure until the number of pages left to be transferred is less than some threshold or the system notices that no forward progress is being made (i.e., no reduction in the number of newly modified pages still to be transferred). The threshold (which may be zero), may be determined as an absolute or relative number of pages, either ahead of time, or according to any known adaptive routine.

Each subsequent iteration should take less time because fewer pages will need to be transferred; the transfer process should therefore converge towards a number of modified pages that is small enough that they can transferred rapidly. Any newly modified pages remaining to be copied over after the threshold has been reached may then be transferred after the source VM 304 is suspended and before non-memory state is copied over; alternatively, these remaining pages may be paged in by the destination VM 304' either on demand or asynchronously after the source VM 304 is suspended and the destination VM 304' is resumed from the suspended source state from where the source VM 304 was stopped.

It will be appreciated that during the iterative transfer of pages from the source VM 304 to the destination VM 304', the source VM 304, which has been 'unstunned' may continue to conduct IO using the first request queue 380-1 and using the first response queue 380-2. The transfer of the snapshotted of the state information 386-1 and 386-2, which was created originally in the VF 316, ensures that processing of IOs through those queues 380-1 and 380-2 picks up after remapping and unstunning of the VM 304 where it left off prior to the stunning and remapping of the VM 304. Moreover, since following remapping, processing of the queues 380-1 and 380-2 involves the VMM 323 and the hypervisor kernel 310, the state information 386-1 and 386-2 of page 511 can be transferred over to the destination VM 304' just like any other memory page.

VF Device Emulation or Not on Destination Host Machine

In the course of the migration process described above, assuming that an SR-IOV capable adapter exists on the destination machine 404-2, and that the virtual function has been provisioned for the destination VM 304' and further assuming that the saved VF device interface response queue is empty, then following snapshotting, restoring and re-mapping, the VF device interface emulation via a virtualization intermediary (not shown) on the destination machine 404-2 is dismantled and the first HSA PCI memory space (not shown) of the destination VM 304' is re-mapped for direct access to physical storage via a VF on the SR IOV storage adapter of the destination machine 404-2.

However, if the destination machine 404-2 has an SR IOV adapter, but the saved VF device interface response queue is not empty, then the destination VM continues to use a VF device interface emulation on the destination machine 404-2 until the response queue becomes empty, and then dismantles the device emulation. Once the VF device emulation has been dismantled and the destination VM is configured for direct IO storage access over the VF, the VF device interface is activated using a checkpointed snapshot from the emulated device interface of the migration-source VM 304.

On the other hand, if the destination machine 404-2 has no SR-IOV capable adapter, then the destination VM 304' continues using the VF device emulation on the destination machine 404-2.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. In a system of computing machines that includes a source computing machine and a destination computing machine, wherein the source computing machine is configured to implement a source virtual machine (VM) and a virtualization intermediary, and wherein the source computing machine includes a physical storage adapter that is configured to implement a physical function (PF) and a virtual function (VF) to support IO operations between the source VM and physical storage accessible by the source VM, a method to migrate the source VM from the source machine to the destination machine comprising:
inserting one or more requests into a request queue within a first memory region of the source computing machine that is associated with the source VM;
providing within a memory region of the VF first state information that is indicative of locations of the requests inserted to the request queue;
de-queuing one or more of the requests from one or more of the locations in the request queue indicated by the first state information to the VF;
transmitting the one or more requests from the VF to the physical storage;
receiving by the VF from the physical storage corresponding responses to the transmitted requests;
suspending the de-queuing of requests from the request queue to the VF;
while suspending the de-queuing of requests, determining when no more outstanding responses to previous requests remain to be received;
in response to a determination that no more outstanding responses to previous requests remain to be received, transferring the first state information from the VF to the PF and from the PF to a second memory region associated with the virtualization intermediary within the source computing machine;
after transferring the first state information to the second memory region,
de-queuing one or more additional requests from one or more other locations in the request queue indicated by the first state information within the second memory region;
transmitting the one or more additional requests from the PF to the physical storage; and
utilizing the virtualization intermediary to transmit the first state information from the second memory region within the source computing machine to the destination machine.

2. The method of claim 1 further including:
configuring the source computing machine to implement an emulated hybrid storage adapter (HSA) within the source computing machine that includes a first HSA memory space that provides access from the source VM directly to the VF and that includes a second HSA memory space that provides access from the source VM to the PF;
wherein before transferring the first state information, the source VM maps requests through the first HSA memory space to the VF; and further including:
after transferring the first state information to source computing machine memory, changing a mapping of the first HSA memory space from pointing to the VF to pointing to the memory region associated with the virtualization intermediary of the source computing machine.

3. The method of claim 2,
wherein the source VM maps certain non-IO requests through the second HSA memory space to the memory region associated with the virtualization intermediary of the source computing machine.

4. The method of claim 1 further including:
providing a limit upon the number of requests that may be inserted into the request queue.

5. The method of claim 1 further including:
prior to suspending the de-queuing of requests, flushing all requests from the request queue.

6. The method of claim 1 further including:
in response to a determination that no more outstanding responses to previous requests remain to be received, suspending operation of the source VM.

7. The method of claim 1 further including:
in response to a determination that no more outstanding responses to previous requests remain to be received, suspending operation of the source VM; and after transferring the first state information to the source computing machine memory, resuming operation of the source VM.

8. The method of claim 1,
wherein the first state information includes an index to a location within a register that is indicative of a slot location within the request queue.

9. In a system of computing machines that includes a source computing machine and a destination computing machine, wherein the source computing machine is configured to implement a source virtual machine (VM) and a virtualization intermediary, and wherein the source computing machine includes a physical storage adapter that is configured to implement a physical function (PF) and a virtual function (VF) to support IO operations between the VM and physical storage accessible by the source VM, a method to migrate the source VM from the source machine to the destination machine comprising:

transmitting one or more requests from the VF to the physical storage;
receiving by the VF one or more responses to the transmitted requests from physical storage;
providing first state information within a memory region of the VF that is indicative of locations in a response queue within a first memory region of the source computing machine associated with the source VM;
inserting the one or more responses received by the VF to one or more of the locations in the response queue indicated by the first state information;
suspending the transmitting of requests;
while suspending, determining when no more outstanding responses to requests remain to be received;
in response to a determination that no more outstanding responses to previous requests remain to be received, transferring the first state information from the VF to the PF and from the PF to a second memory region associated with the virtualization intermediary within the source computing machine;
after transferring the first state information to the second memory region,
transmitting one or more additional requests from the PF to the physical storage;
receiving one or more additional responses by the PF from the physical storage;
inserting the one or more additional responses received by the PF to one or more other locations in the response queue indicated by the first state information within the second memory region; and
utilizing the virtualization intermediary to transmit the first state information from the second memory region within the source computing machine to the destination machine.

10. The method of claim 9 further including:
configuring the source computing machine to implement an emulated hybrid storage adapter (HSA) within the source computing machine that includes a first HSA memory space that provides access from the source VM directly to the VF and that includes a second HSA memory space that provides access from the source VM to the PF;
wherein before transferring the first state information, the source VM maps requests through the first HSA memory space to the VF; and further including:
after transferring the first state information to source computing machine memory, changing a mapping of the first HSA memory space from pointing to the VF to pointing to the a memory region associated with the virtualization intermediary of the source computing machine.

11. The method of claim 10,
wherein the source VM maps certain non-IO requests and response through the second HSA memory space.

12. The method of claim 9 further including:
in response to a determination that no more outstanding responses to previous requests remain to be received, suspending operation of the source VM.

13. The method of claim 9 further including:
in response to a determination that no more outstanding responses to previous requests remain to be received, suspending operation of the source VM; and
after transferring the first state information to source computing machine memory, resuming operation of the source VM.

14. The method of claim 9,
wherein the first state information includes an index to a location within a register that is indicative of a slot location within the response queue.

15. In a system of computing machines that includes a source computing machine and a destination computing machine, wherein the source computing machine is configured to implement a source virtual machine (VM) and a virtualization intermediary, and wherein the source computing machine includes a physical storage adapter that is configured to implement a physical function (PF) and a virtual function (VF) to support IO operations between the source VM and physical storage accessible by the source VM, a method to migrate the source VM from the source machine to the destination machine comprising:

inserting one or more requests into a request queue within a first memory region of the source computing machine associated with the source VM;
providing within a memory region of the VF first state information that is indicative of locations of the requests inserted to the request queue;
transmitting one or more of the requests from the VF to the physical storage;
receiving by the VF one or more responses to the transmitted requests from physical storage;
providing the memory region of the VF second state information that is indicative of locations of responses within a response queue;
inserting the one or more responses received by the VF to one or more of the locations in the response queue indicated by the second state information;
suspending the de-queuing of requests from the request queue to the VF;
while suspending the de-queuing of requests, determining when no more outstanding responses to previous requests remain to be received;
in response to a determination that no more outstanding responses to previous requests remain to be received, transferring the first state information and the second state information from the VF to the PF and from the PF to a second memory region of the source computing machine;
after transferring the first state information to a second memory region associated with the virtualization intermediary within the source computing machine,
de-queuing one or more additional requests from one or more other locations in the request queue indicated by the first state information within the second memory region, and
transmitting the one or more requests from the PF to the physical storage, receiving the additional responses by the PF from the physical storage;

inserting the additional responses received by the PF to one or more other locations in the response queue indicated by the second state information within the second memory region; and utilizing the virtualization intermediary to transmit the first state information and the second state information from the second memory region within the source computing machine to the destination machine.

\* \* \* \* \*